(12) United States Patent
Murata et al.

(10) Patent No.: US 10,247,900 B2
(45) Date of Patent: Apr. 2, 2019

(54) OPTICAL FIBER RIBBON, METHOD FOR MANUFACTURING OPTICAL FIBER RIBBON, AND UV-CURABLE RESIN COMPOSITION USED FOR FORMATION OF CONNECTION PARTS IN INTERMITTENTLY CONNECTED OPTICAL FIBER RIBBON

(71) Applicant: Fujikura Ltd., Koto-ku, Tokyo (JP)

(72) Inventors: Akira Murata, Sakura (JP); Mizuki Isaji, Sakura (JP); Ken Osato, Sakura (JP); Naoki Okada, Sakura (JP)

(73) Assignee: FUJIKURA LTD., Koto-Ku, Tokyo ( * ) Notice: Subject to any disclaimer, the term of this patent is extended or adjusted under 35 U.S.C. 154(b) by 0 days.

(21) Appl. No.: 15/511,330

(22) PCT Filed: Aug. 31, 2016

(86) PCT No.: PCT/JP2016/075424
§ 371 (c)(1),
(2) Date: Mar. 15, 2017

(87) PCT Pub. No.: WO2017/094302
PCT Pub. Date: Jun. 8, 2017

(65) Prior Publication Data
US 2017/0285287 A1    Oct. 5, 2017

(30) Foreign Application Priority Data

Dec. 4, 2015 (JP) .................................. 2015-237214

(51) Int. Cl.
*G02B 6/44* (2006.01)
*B29D 11/00* (2006.01)
(Continued)

(52) U.S. Cl.
CPC ........ *G02B 6/448* (2013.01); *B29D 11/00663* (2013.01); *B29D 11/00721* (2013.01);
(Continued)

(58) Field of Classification Search
CPC .............................. G02B 6/4403; G02B 6/448
See application file for complete search history.

(56) References Cited

U.S. PATENT DOCUMENTS

| 5,502,145 A | 3/1996 | Szum |
| 5,595,820 A | 1/1997 | Szum |

(Continued)

FOREIGN PATENT DOCUMENTS

| CN | 103242796 A | 8/2013 |
| JP | 09-509642 A | 9/1997 |

(Continued)

OTHER PUBLICATIONS

Office Action dated Nov. 1, 2016, in JP 2015-237214.
(Continued)

*Primary Examiner* — Rhonda S Peace
(74) *Attorney, Agent, or Firm* — Foley & Lardner LLP (57) ABSTRACT

Disclosed is a method for manufacturing an intermittently connected optical fiber ribbon that includes a plurality of optical fibers arranged side by side, and connection parts arranged intermittently and each connecting two adjacent optical fibers. The method involves: a step of applying, between the optical fibers, a UV-curable resin including a siloxane structure in its molecule; a step of removing a portion of the UV-curable resin applied between the optical fibers; and a step of irradiating the UV-curable resin between the optical fibers with UV rays and forming the connection parts.

11 Claims, 3 Drawing Sheets

(51) Int. Cl.
*C08F 2/48* (2006.01)
*B29K 83/00* (2006.01)

(52) U.S. Cl.
CPC ............... *C08F 2/48* (2013.01); *G02B 6/44* (2013.01); *G02B 6/4403* (2013.01); *B29K 2083/00* (2013.01)

(56) References Cited

U.S. PATENT DOCUMENTS

| | | | |
|---|---|---|---|
| 5,908,873 A | 6/1999 | Shustack | |
| 6,014,488 A | 1/2000 | Shustack | |
| 6,455,607 B1 | 9/2002 | Shustack | |
| 7,509,009 B2* | 3/2009 | Suzuki | G02B 6/4404 385/100 |
| 8,412,014 B2* | 4/2013 | Sato | G02B 6/4404 385/100 |
| 9,086,555 B2* | 7/2015 | Namazue | G02B 6/44 |
| 9,116,321 B2* | 8/2015 | Sato | G02B 6/4403 |
| 9,389,386 B2* | 7/2016 | Matsuzawa | G02B 6/4404 |
| 2002/0023287 A1 | 3/2002 | Kawada et al. | |
| 2008/0170829 A1* | 7/2008 | Suzuki | G02B 6/4472 385/115 |
| 2013/0303649 A1* | 11/2013 | Ichiryu | C08F 8/00 522/75 |
| 2014/0314382 A1* | 10/2014 | Sato | G02B 6/4403 385/103 |
| 2015/0049997 A1* | 2/2015 | Isaji | G02B 6/4495 385/114 |
| 2016/0161692 A1* | 6/2016 | Namazue | G02B 6/4403 385/114 |
| 2016/0299310 A1* | 10/2016 | Kaneko | G02B 6/44 |
| 2017/0090135 A1* | 3/2017 | Sato | G02B 6/4403 |
| 2017/0184803 A1* | 6/2017 | Namazue | G02B 6/4404 |
| 2017/0285287 A1* | 10/2017 | Murata | G02B 6/448 |
| 2018/0163075 A1* | 6/2018 | Ren | C09D 133/10 |

FOREIGN PATENT DOCUMENTS

| | | |
|---|---|---|
| JP | 09-297225 A | 11/1997 |
| JP | 2000-507369 A | 6/2000 |
| JP | 2004-346231 A | 12/2004 |
| JP | 2007-279226 A | 10/2007 |
| JP | 2010-033010 A | 2/2010 |
| JP | 2011-158581 A | 8/2011 |
| JP | 2012-042751 A | 3/2012 |
| JP | 2012-108331 A | 6/2012 |
| WO | WO 98/33081 A1 | 7/1998 |

OTHER PUBLICATIONS

International Search Report and Written Opinion dated Nov. 8, 2016, in PCT/JP2016/075424.

Office Action dated Jan. 15, 2018, in Canadian Application No. CA 2958489.

Office Action dated Jul. 27, 2018, in Canadian Application No. 2958489.

* cited by examiner

OPTICAL FIBER RIBBON, METHOD FOR MANUFACTURING OPTICAL FIBER RIBBON, AND UV-CURABLE RESIN COMPOSITION USED FOR FORMATION OF CONNECTION PARTS IN INTERMITTENTLY CONNECTED OPTICAL FIBER RIBBON

TECHNICAL FIELD

The present invention relates to an optical fiber ribbon, a method for manufacturing an optical fiber ribbon, and a UV-curable resin composition used for the formation of connections part in an intermittently connected optical fiber ribbon.

BACKGROUND ART

Patent Literature 1 discloses an optical fiber ribbon (intermittently connected optical fiber ribbon) in which a plurality of optical fibers are arranged side by side and connected intermittently. Patent Literatures 2 and 3 disclose methods for manufacturing such intermittently connected optical fiber ribbons. More specifically, Patent Literatures 2 and 3 describe the manufacture of an intermittently connected optical fiber ribbon by: applying a curable resin between adjacent optical fibers; blocking the still-uncured curable resin to form non-connected parts (separated parts) between the optical fibers; and curing the curable resin during a period before the optical fibers are gathered together.

CITATION LIST

Patent Literature

Patent Literature 1: JP 2007-279226A
Patent Literature 2: JP 2010-33010A
Patent Literature 3: JP 2012-42751A

SUMMARY OF INVENTION

Technical Problem

When the still-uncured curable resin is blocked as described in Patent Literatures 2 and 3, there are instances in which parts that should be made into non-connected parts between adjacent optical fibers are inadvertently connected by the curable resin. As a result, the connection parts of the intermittently connected optical fiber ribbon may become longer than desired, making it difficult to form the connection parts and non-connected parts as designed.

An objective of the invention is to form connection parts and non-connected parts of an intermittently connected optical fiber ribbon as designed.

Solution to Problem

A primary aspect of the invention for achieving the aforementioned objective is an intermittently connected optical fiber ribbon including: a plurality of optical fibers arranged side by side; and connection parts arranged intermittently and each connecting two adjacent ones of the optical fibers, the connection part being formed by curing a UV-curable resin including a siloxane structure in its molecule.

Other features of the invention are made clear by the following description and the drawings.

Advantageous Effects of Invention

This invention allows connection parts and non-connected parts of an intermittently connected optical fiber ribbon to be formed as designed.

DESCRIPTION OF EMBODIMENTS

At least the following matters are disclosed in the following description and the drawings.

Disclosed is an intermittently connected optical fiber ribbon including: a plurality of optical fibers arranged side by side; and connection parts arranged intermittently and each connecting two adjacent ones of the optical fibers, the connection part being formed by curing a UV-curable resin including a siloxane structure in its molecule. With this intermittently connected optical fiber ribbon, connection parts and non-connected parts can be formed as designed.

Preferably, the aforementioned UV-curable resin includes a urethane oligomer including the aforementioned siloxane structure. With this intermittently connected optical fiber ribbon, connection parts and non-connected parts can be formed as designed.

Preferably, the aforementioned UV-curable resin includes a reactive monomer including the aforementioned siloxane structure. With this intermittently connected optical fiber ribbon, connection parts and non-connected parts can be formed as designed.

Also disclosed is a method for manufacturing an intermittently connected optical fiber ribbon that includes a plurality of optical fibers arranged side by side, and connection parts arranged intermittently and each connecting two adjacent ones of the optical fibers, the method involving: a step of applying, between the optical fibers, a UV-curable resin including a siloxane structure in its molecule; a step of removing a portion of the UV-curable resin applied between the optical fibers; and a step of irradiating the UV-curable resin between the optical fibers with UV rays and forming the connection parts. With this manufacturing method, connection parts and non-connected parts of an intermittently connected optical fiber ribbon can be formed as designed.

Also disclosed is a UV-curable resin composition used for formation of connection parts that are intermittently arranged to connect two adjacent ones of optical fibers in an intermittently connected optical fiber ribbon, the UV-curable resin composition including a siloxane structure in its molecule. With this UV-curable resin composition, connection parts and non-connected parts of an intermittently connected optical fiber ribbon can be formed as designed.

Present Embodiment

Figure 1A:
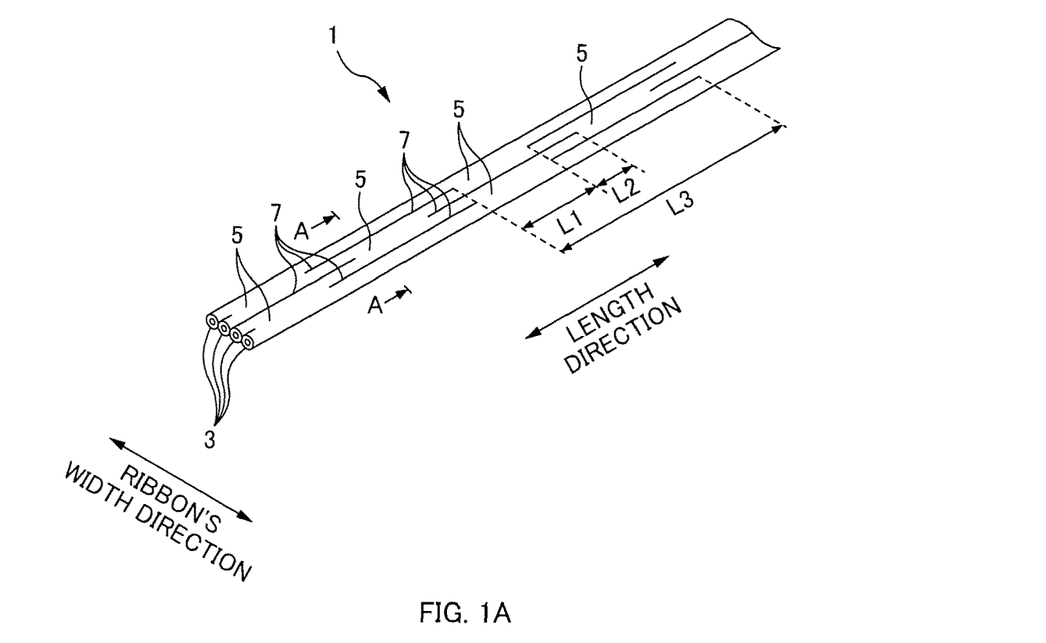
FIG. 1A is a perspective view of an intermittently connected optical fiber ribbon 1.
Figure 1B:
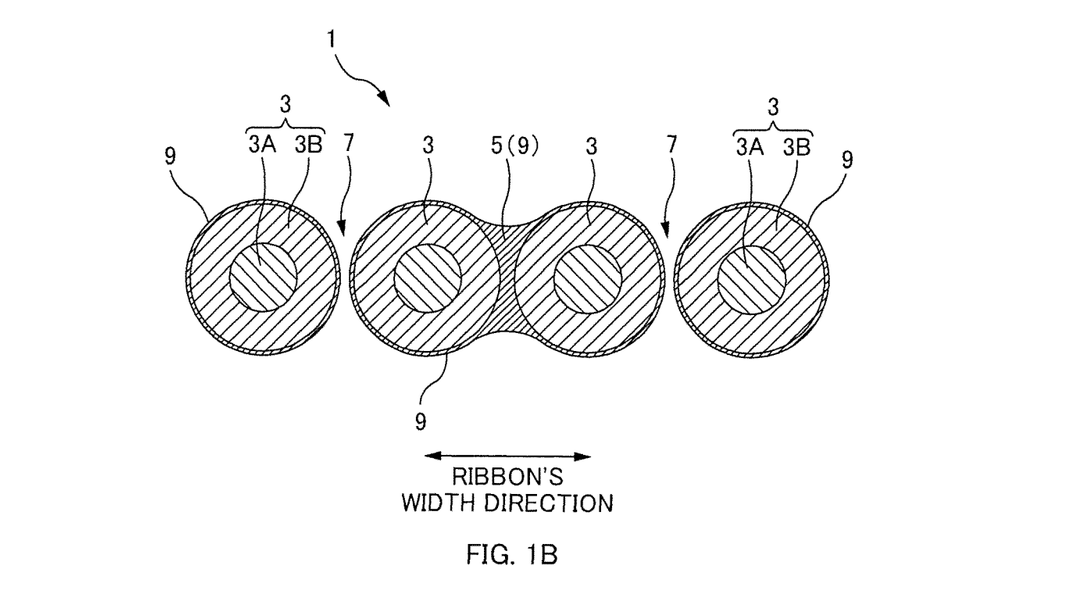
FIG. 1B is a cross-sectional view taken along line A-A of FIG. 1A.

Structure of Intermittently Connected Optical Fiber Ribbon:

FIG. 1A is a perspective view of an intermittently connected optical fiber ribbon 1. FIG. 1B is a cross-sectional view taken along line A-A of FIG. 1A.

In the following description, the various directions are defined as illustrated in FIG. 1A. The direction parallel to the optical fibers 3 constituting the optical fiber ribbon 1 (the direction of the optical axis of the optical fiber 3) is also referred to as the "length direction". The direction in which the plurality of optical fibers 3 constituting the optical fiber ribbon 1 are arranged is also referred to as the "ribbon's width direction".

The intermittently connected optical fiber ribbon 1 is an optical fiber ribbon 1 including a plurality of optical fibers 3 (four in this example) arranged side by side and connected intermittently. Two adjacent ones of the optical fibers 3 are connected by a connection part 5. Between two adjacent optical fibers, a plurality of connection parts 5 are arranged intermittently in the length direction. The plurality of connection parts 5 of the intermittently connected optical fiber ribbon 1 are arranged intermittently and two-dimensionally in the length direction and the ribbon's width direction. Regions other than the connection parts 5 between the two adjacent optical fibers constitute non-connected parts 7 (separated parts). In the non-connected parts 7, the two adjacent optical fibers 3 are not restrained. Thus, the intermittently connected optical fiber ribbon 1 can be rolled up into a cylindrical form, or folded up, and the multitude of optical fibers 3 can be bundled with high density.

The intermittently connected optical fiber ribbon 1 is not limited to the example illustrated in FIG. 1A. For example, the number of optical fibers 3 constituting the optical fiber ribbon 1 may be changed. Further, in the intermittently connected optical fiber ribbon 1 illustrated in FIG. 1A, the connection part 5 is formed at length L1, a region without any connection parts 5 is formed at length L2, and the connection parts 5 are arranged intermittently in the length direction at an interval of length L3, but the lengths and arrangement of the connection parts 5 can be changed.

As illustrated in FIG. 1B, the optical fiber 3 (jacketed optical fiber) includes a glass fiber 3A and a cover layer 3B. The outer periphery of the optical fiber 3 is coated with a connecting agent 9 (UV-curable resin). Two adjacent optical fibers 3 are connected at the connection parts 5 by the connecting agent 9 that coats the outer periphery of each optical fiber 3. The connecting agent 9 constituting the connection parts 5 is described further below.

Figure 2A:
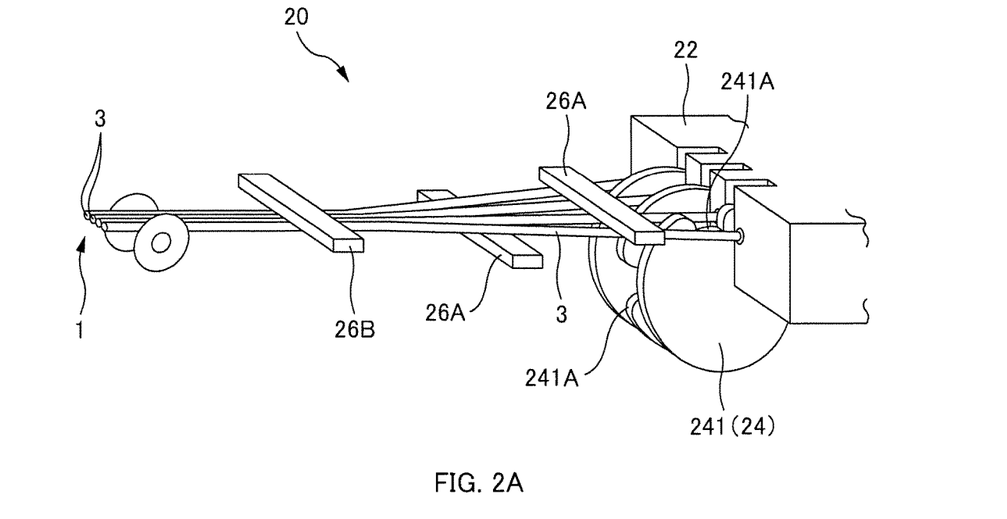
FIG. 2A is a diagram illustrating a device for manufacturing the intermittently connected optical fiber ribbon 1 (ribbon manufacturing device).
Figure 2B:
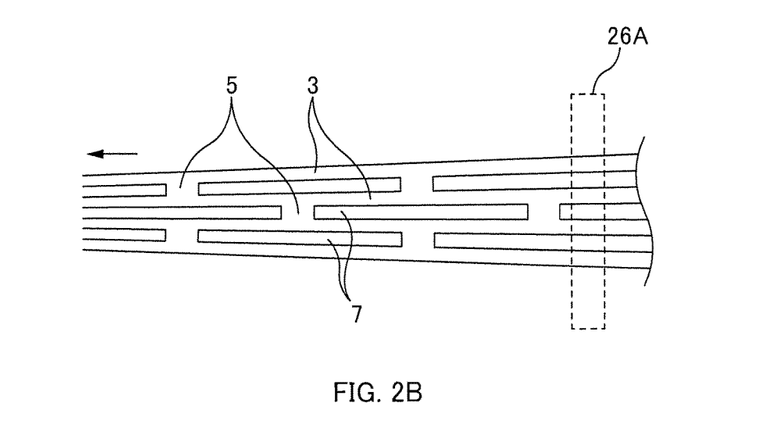
FIG. 2B is a diagram illustrating how optical fibers 3 are gathered after application of a connecting agent 9.

Method for Manufacturing Intermittently Connected Optical Fiber Ribbon:

FIG. 2A is a diagram illustrating a device for manufacturing the intermittently connected optical fiber ribbon 1 (ribbon manufacturing device). FIG. 2B is a diagram illustrating how optical fibers 3 are gathered after application of the connecting agent 9. The ribbon manufacturing device includes an application section, a removal section, and a light source.

The application section is a device that applies the connecting agent 9 (UV-curable resin). Herein, the application section applies the connecting agent 9, which is in liquid-form, onto the outer periphery of each optical fiber 3 and between the optical fibers.

The removal section is a device that removes a portion of the liquid-form connecting agent 9 (UV-curable resin) applied between the optical fibers while leaving a portion of the connecting agent. The removal section includes rotary blades each having a recess. The rotary blades rotate in accordance with the supply speed of the optical fibers 3, and the rotary blades remove (cut) the connecting agent 9 applied between the optical fibers while leaving the connecting agent 9 at the recesses.

The light source is an irradiation device that irradiates the connecting agent 9 (UV-curable resin), which has been applied onto the outer periphery of each optical fiber 3 and between the optical fibers, with UV rays. The light source includes a temporary curing light source and a permanent curing light source. The temporary curing light source temporarily cures the connecting agent 9 by irradiating it with UV rays. The temporarily cured connecting agent 9 is not yet completely cured, but is in a state where curing has proceeded on the surface thereof. The permanent curing light source permanently cures the connecting agent 9 by irradiating it with stronger UV rays than those of the temporary curing light source. The permanently cured UV-curable resin is cured to the inside. (The permanently cured UV-curable resin, however, has moderate elasticity to allow the intermittently connected optical fiber ribbon 1 to be rolled up into a cylindrical form or folded up).

As illustrated in FIG. 2B, the optical fibers 3 immediately after exiting the application section and the removal section are spaced apart from one another. In this state, the temporary curing light source irradiates the connecting agent 9 (UV-curable resin) with UV rays, to temporarily cure the connecting agent 9. After temporarily curing the connecting agent 9, the distance between the optical fibers 3 is gradually reduced, and the plurality of optical fibers 3 are arranged side by side and gathered into a ribbon-form. Note that, because the connecting agent 9 has been temporarily cured, even if parts where the connecting agent 9 has been removed (i.e., the separated parts) come into contact with one another, these parts do not get connected. Also, because the connecting agent has not been permanently cured yet, the distance between the optical fibers 3 can be narrowed (i.e., the fibers can be gathered) even in regions connected by the connecting agent 9. By irradiating the connecting agent with UV rays by the permanent curing light source and permanently curing the connecting agent 9, the intermittently connected optical fiber ribbon 1 illustrated in FIG. 1A is manufactured.

Connecting Agent:

In the aforementioned removal section, the UV-curable resin is removed (cut) by rotating the rotary blades. At this time, the shearing force caused by the rotary blades may reduce the viscosity of the liquid-form connecting agent 9.

Figure 3A:
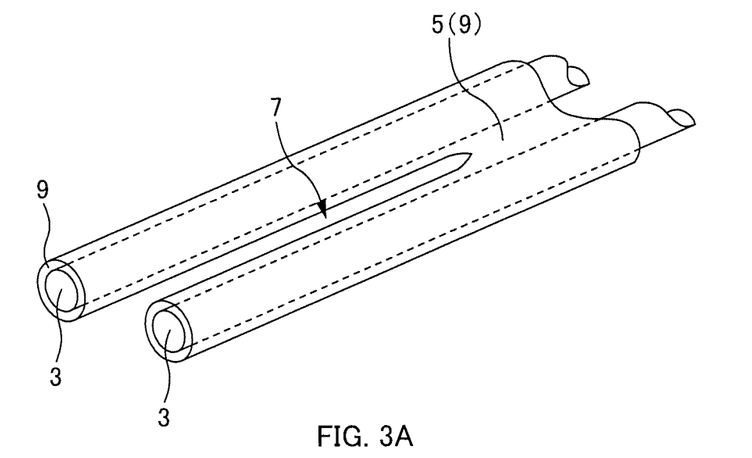
FIGS. 3A and 3B are diagrams illustrating the effect of reduction in viscosity of the connecting agent 9.
Figure 3B:
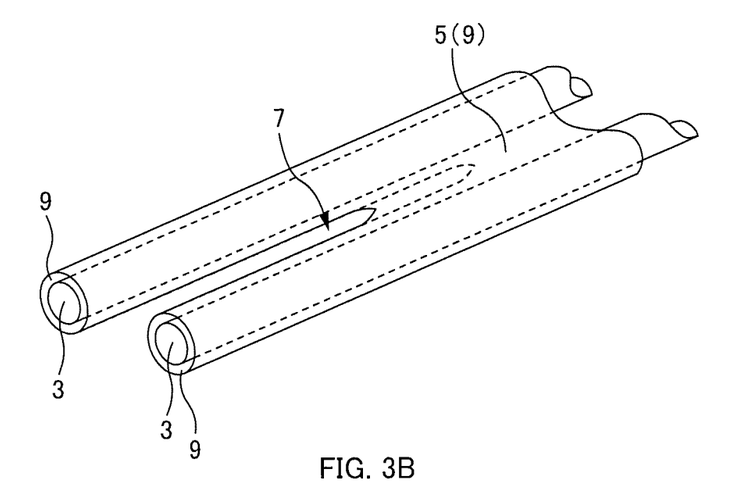

FIGS. 3A and 3B are diagrams illustrating the effect of reduction in viscosity of the connecting agent 9.

If the viscosity of the connecting agent 9 drops at the time of removal of the connecting agent 9, even when a separated part is formed by removing the connecting agent 9 as illustrated in FIG. 3A, the separated part may get connected as illustrated in FIG. 3B. Stated differently, a reduction in the viscosity of the connecting agent 9 may cause a region connected by the connecting agent 9 to flow and spread out. If the separated part (section where the connecting agent 9 has been removed) gets connected, the length of the connection part 5 of the intermittently connected optical fiber ribbon 1 (the length L1 illustrated in FIG. 1A) becomes longer. As a result, a greater force (force for breaking the connection part 5) becomes necessary at the time of separating individual optical fibers 3 from the optical fiber ribbon 1, which may cause damage to the optical fibers 3 and lead to deterioration in workability, and may also cause distortion in fibers after they are made into a cable and/or an increase in optical loss.

In the present embodiment, a connecting agent 9 (UV-curable resin) including a siloxane structure in its molecule is used for forming the connection parts 5 of the intermittently connected optical fiber ribbon 1. Because the connecting agent 9 includes a siloxane structure in its molecule, viscosity reduction can be suppressed at the time of removing the connecting agent 9, and the separated parts (parts where the connecting agent 9 has been removed) can be prevented from getting connected. Stated differently, shape retainability of the connecting agent 9 immediately after removal by the removal section is improved, and regions connected by the connecting agent 9 can be prevented from flowing and spreading out.

Herein, "including a siloxane structure in its molecule" refers to a state wherein silicone is incorporated in a resin by cross-linking. Therefore, the connecting agent 9 of the present embodiment does not encompass connecting agents in which silicone is simply added to a resin without being cross-linked. Note that, when an intermittently connected optical fiber ribbon 1 is manufactured by using a connecting agent in which silicone is simply added to resin without being cross-linked, the surface stays sticky (in an adhesive state), even after the connecting agent has been cured.

The connecting agent 9 of the present embodiment is a UV-curable resin that includes a urethane oligomer including a siloxane structure. The urethane oligomer including a siloxane structure is made by reacting: a silicone compound that includes, in its molecule, a siloxane structure including one or more hydroxyl groups; an acrylate including a hydroxyl group; and an isocyanate.

Examples of the aforementioned silicone compound that includes a siloxane structure including hydroxyl group(s) include
α-[3-(2'-hydroxyethoxy)propyl]-ω-trimethylsilyloxy polydimethylsiloxane,
α-[3-(2'-hydroxyethoxy)propyl]-ω-trimethylsilyloxy polydiphenylsiloxane,
α-[3-(2',3'-dihydroxypropyloxy)propyl]-ω-trimethylsilyloxy polydimethylsiloxane,
α-[3-(2',3'-dihydroxypropyloxy)propyl]-ω-trimethylsilyloxy polydiphenylsiloxane,
α-[3-(2'-ethyl-2'-hydroxymethyl-3-hydroxy)propyl]-ω-trimethylsilyloxy polydimethylsiloxane,
α-[3-(2'-ethyl-2'-hydroxymethyl-3-hydroxy)propyl]-ω-trimethylsilyloxy polydiphenylsiloxane,
α-[3-(2'-hydroxy-3'-isopropylamino)propyl]-ω-trimethylsilyloxy polydimethylsiloxane, and
α-[3-(2'-hydroxy-3'-isopropylamino)propyl]-ω-trimethylsilyloxy polydiphenylsiloxane.

The aforementioned silicone compound that includes a siloxane structure including hydroxyl group(s) is also available as commercially available products, such as Silaplane FM-0411, FM-0413, FM-0415, FM-0421, FM-0425, FM-D411, FM-D421, and FM-D425 (all manufactured by Chisso Corporation), and Shin-Etsu Silicone X-22-170A, X-22-170B, X-22-170D, X-22-176B, X-22-176D, X-22-176DX, X-22-178A, and X-22-178B (all manufactured by Shin-Etsu Chemical Co., Ltd.).

Examples of the aforementioned acrylate including a hydroxyl group include 2-hydroxyethyl (meth)acrylate, 2-hydroxypropyl (meth)acrylate, 2-hydroxybutyl (meth) acrylate, 2-hydroxy-3-phenyloxypropyl (meth)acrylate, 1,4-butanediol mono(meth)acrylate, 2-hydroxyalkyl (meth) acryloyl phosphate, 4-hydroxycyclohexyl (meth)acrylate, 1,6-hexanediol mono(meth)acrylate, neopentyl glycol mono (meth)acrylate, trimethylolpropane di(meth)acrylate, trimethylolethane di(meth)acrylate, pentaerythritol tri(meth) acrylate, dipentaerythritol penta(meth)acrylate, and (meth) acrylates represented by the following formula (1) or (2):

$$CH_2=C(R^1)-COOCH_2CH_2-\\(OCOCH_2CH_2CH_2CH_2)_n-OH \qquad (1);$$

$$CH_2=C(R^1)-COOCH_2CH(OH)CH_2-O-(C_6H_5) \qquad (2).$$

(In each formula, $R^1$ represents a hydrogen atom or a methyl group, and n represents a number from 1 to 15.) It is also possible to use a compound obtained through an addition reaction between (meth)acrylic acid and a compound including a glycidyl group, such as an alkyl glycidyl ether, an allyl glycidyl ether, or glycidyl (meth)acrylate. Among the aforementioned acrylates including a hydroxyl group, 2-hydroxyethyl (meth)acrylate and 2-hydroxypropyl (meth) acrylate are preferred. One type of the aforementioned compound may be used alone, or two or more types may be used in combination.

Examples of the aforementioned isocyanate include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylene bis(4-cyclohexyl isocyanate), 2,2,4-trimethylhexamethylene diisocyanate, bis(2-isocyanate ethyl)fumarate, 6-isopropyl-1,3-phenyldiisocyanate, 4-diphenylpropane diisocyanate, lysine diisocyanate, hydrogenated diphenylmethane diisocyanate, hydrogenated xylylene diisocyanate, tetramethyl-xylylene diisocyanate, and 2,5- (or 6-) bis(isocyanate methyl)-bicyclo[2.2.1]heptane. Among the above, 2,4-tolylene diisocyanate, isophorone diisocyanate, xylylene diisocyanate, and methylene bis(4-cyclohexyl isocyanate) are preferred. One type of the aforementioned compound may be used alone, or two or more types may be used in combination.

Examples of reactions for obtaining the aforementioned urethane oligomer include: methods of reacting the aforementioned silicone compound, the acrylate including a hydroxyl group, and the isocyanate by placing them in a single batch; methods of reacting the silicone compound and the isocyanate, and then reacting the acrylate including a hydroxyl group; and methods of reacting the polyisocyanate and the acrylate including a hydroxyl group, and then reacting the silicone compound. It is preferable to perform the reaction such that the hydroxyl group equivalent of the silicone compound including hydroxyl group(s) and of the acrylate including a hydroxyl group substantially matches the isocyanate equivalent of the polyisocyanate. Further, by adding a polyol as a starting substance of the aforementioned reaction, it is possible to introduce a structure such as a polyurethane polyol between the polydimethylsiloxane structure and the (meth)acryloyl group.

Examples of polyols usable herein include polyether diols, polyester diols, polycarbonate diols, and polycaprolactone diols. Two or more types of these polyols may be used in combination. The bonding manner of the structural units in the polyol is not particularly limited, and may either be random bonding, block bonding, or graft bonding.

Concrete examples of the aforementioned polyether diols include polyethylene glycol, polypropylene glycol, polytetramethylene glycol, polyhexamethylene glycol, polyheptamethylene glycol, polydecamethylene glycol, and polyether diols obtained by subjecting at least two types of ionically polymerizable cyclic compounds to ring-opening copolymerization. Examples of the ionically polymerizable cyclic compounds include cyclic ethers, such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monooxide, isoprene monooxide, vinyloxetane, vinyltetrahydrofuran, vinylcyclohexene oxide, phenyl glycidyl ether, butyl glycidyl ether, and benzoic acid glycidyl ester. Examples of concrete combinations of the aforementioned two or more types of ionically polymerizable cyclic compounds include: tetrahydrofuran and propylene oxide; tetrahydrofuran and 2-methyltetrahydrofuran; tetrahydrofuran and 3-methyltetrahydrofuran; tetrahydrofuran and ethylene oxide; propylene oxide and ethylene oxide; butene-1-oxide and ethylene oxide; and a terpolymer of tetrahydrofuran, butene-1-oxide, and ethylene oxide. It is also possible to use a polyether diol obtained by subjecting, to ring-opening copolymerization, the aforementioned ionically polymerizable cyclic compound and a cyclic imine such as ethylene imine, a cyclic lactone such as β-propiolactone or glycolic acid lactide, or a dimethylcyclopolysiloxane. The ring-opened copolymers of these ionically polymerizable cyclic compounds may be random-bonded or block-bonded.

In addition to the aforementioned urethane oligomer including a siloxane structure, the connecting agent 9 of the present embodiment may also include a reactive monomer.

The reactive monomer may be a monofunctional monomer or a polyfunctional monomer.

Examples of monofunctional monomers include: vinyl group-containing monomers such as N-vinylpyrrolidone, N-vinylcaprolactam, vinylimidazole, and vinylpyridine; and (meth)acryloyl group-containing monomers such as isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth)acrylic amide, isobutoxymethyl (meth)acrylic amide, N,N-dimethyl(meth)acrylic amide, t-octyl(meth)acrylic amide, dimethylaminoethyl (meth)acrylate, diethylaminoethyl (meth)acrylate, 7-amino-3,7-dimethyloctyl (meth)acrylate, N,N-diethyl(meth)acrylic amide, N,N-dimethylaminopropyl(meth)acrylic amide, hydroxybutyl vinyl ether, lauryl vinyl ether, cetyl vinyl ether, 2-ethylhexyl vinyl ether, and (meth)acryloyl group-containing monomers represented by the following formulas (3) to (5).

(In the formula, $R^2$ represents a hydrogen atom or a methyl group, $R^3$ represents a $C_{2-6}$, preferably $C_{2-4}$ alkylene group, $R^4$ represents a hydrogen atom or a $C_{1-12}$, preferably $C_{1-9}$ alkyl group, and m represents a number from 0 to 12, preferably from 1 to 8.)

(In the formula, $R^2$ has the same meaning as above, $R^5$ represents a $C_{2-8}$, preferably $C_{2-5}$ alkylene group, and p represents a number from 1 to 8, preferably from 1 to 4.)

(In the formula, $R^2$, $R^5$, and p have the same meaning as above, and $R^6$ represents a hydrogen atom or a methyl group.) Examples of commercially available products include: Aronix M-111, M-113, M-114, and M-117 (all manufactured by Toagosei Co., Ltd.); KAYARAD TC110S, R629, and R644 (all manufactured by Nippon Kayaku Co., Ltd.); and Viscoat 3700 (manufactured by Osaka Organic Chemical Industry Ltd.).

Examples of polyfunctional monomers include (meth)acryloyl group-containing monomers, such as trimethylol propane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylol propane trioxyethyl (meth)acrylate, tris(2-hydroxyethyl)isocyanurate tri(meth)acrylate, tris(2-hydroxyethyl)isocyanurate di(meth)acrylate, tricyclodecanediyldimethyl di(meth)acrylate, a di(meth)acrylate of a diol of Bisphenol A ethylene oxide adduct or propylene oxide adduct, a di(meth)acrylate of a diol of hydrogenated Bisphenol A ethylene oxide adduct or propylene oxide adduct, epoxy (meth)acrylate wherein (meth)acrylate is added to Bisphenol A diglycidyl ether, a diacrylate of polyoxyalkylenated Bisphenol A, and triethylene glycol divinyl ether. Examples of commercially available products include: Yupimer UV SA1002 and SA2007 (both manufactured by Mitsubishi Chemical Corporation); Viscoat 700 (manufactured by Osaka Organic Chemical Industry Ltd.); KAYARAD R-604, DPCA-20, -30, -60, -120, HX-620, D-310, and D-330 (all manufactured by Nippon Kayaku Co., Ltd.); and Aronix M-210, M-215, M-315, and M-325 (all manufactured by Toagosei Co., Ltd.). Among the above, tricyclodecanediyldimethyl diacrylate and a diacrylate of polyoxyalkylenated Bisphenol A are preferred.

In addition to the aforementioned urethane oligomer including a siloxane structure, the connecting agent 9 of the present embodiment may include a photopolymerization initiator. By adding a photopolymerization initiator to the connecting agent 9, the connecting agent can be cured when irradiated with UV rays. Examples of such photopolymerization initiators include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenylphosphine oxide, and bis-(2,6-dimethoxybenzoyl)-2,4,4-trimethylpentylphosphine oxide; IRGACURE 184, 369, 651, 500, 907, CGI 1700, CGI 1750, CGI 1850, and CG 24-61 (all manufactured by Ciba-Geigy); Lucirin LR8728 (manufactured by BASF); Darocur 1116 and 1173 (both manufactured by Merck); and Ubecryl P36 (manufactured by UCB).

In addition to the aforementioned photopolymerization initiator, the connecting agent 9 may include a photosensitizer, as necessary. Examples of such photosensitizers include triethylamine, diethylamine, N-methyldiethanol amine, ethanol amine, 4-dimethylaminobenzoic acid, methyl 4-dimethylaminobenzoate, ethyl 4-dimethylaminobenzoate, and isoamyl 4-dimethylaminobenzoate; and Ubecryl P102, 103, 104, and 105 (all manufactured by UCB).

Other than the aforementioned components, it is possible to blend, as necessary, other types of additives, such as an antioxidant. Examples of antioxidants include: Irganox 1010, 1035, 1076, and 1222 (all manufactured by Ciba-Geigy); and Antigen P, 3C, FR, and GA-80 (manufactured by Sumitomo Chemical Industry Company Limited).

The connecting agent 9 may be a UV-curable resin that includes a reactive monomer including a siloxane structure. Examples of silicone compounds including a siloxane structure include the compounds described above. Examples of such reactive monomers include the monomers described above. Also in cases where the connecting agent 9 includes a reactive monomer including a siloxane structure, the aforementioned photopolymerization initiator, photosensitizer, and various types of additives (antioxidants, etc.) may be added thereto.

The connecting agent 9 (UV-curable resin) including a siloxane structure in its molecule is made by adding, to a UV-curable resin serving as a base agent, the aforementioned compound (a liquid-form composition including a urethane oligomer or a reactive monomer) including a siloxane structure in its molecule. The UV-curable resin serving as a base agent includes, for example, a photopolymerizable prepolymer, a photopolymerizable monomer, and a photopolymerization initiator. Examples of photopolymerizable prepolymers include urethane acrylate resins, epoxy acrylate resins, polyol acrylate resins, butadiene acrylate resins, polyester acrylate resins, and silicone acrylate resins. Examples of photopolymerizable monomers include vinylpyrrolidone, hydroxyethyl acrylate, and ethylhexyl acrylate. Examples of photopolymerization initiators include benzophenone-based compounds, acylphosphine oxide-based compounds, and acetophenone-based compounds. The UV-curable resin serving as a base agent is also available as commercially available products, such as DS-2015 (manufactured by DSM) and KG400 (manufactured by PhiChem).

The content by percentage of the aforementioned compound (urethane oligomer or reactive monomer) including a siloxane structure in its molecule with respect to the UV-curable resin serving as a base agent is preferably within a range from 0.1 wt % to 10 wt %, more preferably within a range from 0.2 wt % to 10 wt %. If the content by percentage is lower than the aforementioned range, it is difficult to form the connection parts 5 as designed. If the content by percentage is higher than the aforementioned range, the storage stability of the liquid-form connecting agent 9 (UV-curable resin) deteriorates.

The viscosity of the connecting agent 9 (UV-curable resin) before being cured is preferably within a range from 0.5 to 7.0 MPa·s in a temperature range from 25° C. to 50° C., and more preferably within a range from 0.5 to 1.0 MPa·s at 50° C. In this range, it is easy to apply the connecting agent 9 to the outer periphery of the optical fibers 3 and between the optical fibers.

The Young's modulus of the connecting agent 9 (UV-curable resin) after being permanently cured is preferably within a range from 300 to 1500 MPa, more preferably within a range from 500 to 1200 MPa. In this range, the intermittently connected optical fiber ribbon 1 can be rolled up into a cylindrical form, or folded up.

The connecting agent 9 (UV-curable resin) including a siloxane structure in its molecule is preferably used in the manufacturing method illustrated in FIG. 2A (i.e., a method of removing (cutting) the connecting agent 9 applied between the optical fibers with rotary blades). The connecting agent 9 (UV-curable resin) including a siloxane structure in its molecule can, however, be used in manufacturing intermittently connected optical fiber ribbons 1 according to other manufacturing methods. For example, instead of first applying the connecting agent 9 to the entire outer periphery of each optical fiber 3 and then removing a portion of the connecting agent 9 as described above, the connecting agent 9 may be applied intermittently between the optical fibers with a dispenser to form the connection parts 5 intermittently.

EXAMPLES

A connecting agent 9 (UV-curable resin) was prepared by adding a siloxane-structure-including resin as described in the following Examples 1 to 3 to a UV-curable resin serving as a base agent such that the content by percentage of the siloxane-structure-including resin was 2 wt %.

Example 1

A compound including, in its molecule, a polydimethylsiloxane structure including two acryloyl groups and a urethane bond.

Example 2

A compound including, in its molecule, a polydimethylsiloxane structure including at least one acryloyl group, at least one non-reactive organic group, and a urethane bond.

Example 3

An acrylic monomer including a siloxane structure.
Connecting agents as described in the following Comparative Examples 1 to 3 were also prepared.

Comparative Example 1

A UV-curable resin wherein a modified silicone with a molecular weight of 1500 was added to a UV-curable resin serving as a base agent such that the content by percentage of the modified silicone was 2 wt %.

Comparative Example 2

A UV-curable resin wherein a modified silicone with a molecular weight of 300,000 was added to a UV-curable resin serving as a base agent such that the content by percentage of the modified silicone was 2 wt %.

Comparative Example 3

A UV-curable resin serving as a base agent (i.e., a UV-curable resin with no silicone added).

Each of the aforementioned connecting agents 9 (Examples 1 to 3 and Comparative Examples 1 to 3) were used to prepare respective intermittently connected optical fiber ribbons 1 with the structure illustrated in FIGS. 1A and 1B according to the manufacturing method illustrated in FIGS. 2A and 2B. The length L1 of the connection part 5 (cf. FIG. 1A) was set to 20 mm. (The length L2 illustrated in FIG. 1A was 10 mm, and the length L3 was 60 mm.)

The lengths of connection parts 5 in each prepared intermittently connected optical fiber ribbon 1 were measured, to evaluate whether or not the respective lengths of the connection parts 5 were manufactured as designed. The formation was considered a success in cases where the length of a connection part 5 was within a range of 20 mm±1 mm (i.e., from 19 mm to 21 mm inclusive), and the success rate was calculated by measuring the lengths of sixty connection parts 5. Also, the adhesiveness of the surface of the connecting agent 9 after being cured was also evaluated. No adhesiveness was evaluated as "good", whereas an adhesive state was evaluated as "poor". The evaluation results are as shown below.

|  | Example 1 | Example 2 | Example 3 | Comparative Example 1 | Comparative Example 2 | Comparative Example 3 |
|---|---|---|---|---|---|---|
| Success rate | 100% | 100% | 100% | 98% | 96% | 52% |
| Adhesiveness | Good | Good | Good | Poor | Poor | Good |

As shown in Examples 1 to 3 of Table 1, by forming the connection parts 5 by curing a connecting agent 9 (UV-curable resin) including a siloxane structure in its molecule, it was possible to form the connection parts 5 (and non-connected parts 7) as designed, and the surface of the connecting agent 9 after being cured was in a satisfactory state. In contrast, as shown in Comparative Examples 1 and 2, when the connection parts 5 were formed by curing a connecting agent 9 (UV-curable resin) including silicone, the surface of the connecting agent 9 after being cured was sticky, although the connection parts 5 (and non-connected parts 7) were formed as designed. Further, as shown in Comparative Example 3, when the connection parts 5 were formed by curing a UV-curable resin including no silicone, the connection parts 5 were not formed as designed.

Next, the percentage of addition of the respective compounds of Examples 1 to 3 with respect to the UV-curable resin serving as a base agent was varied within a range from 0.1 wt % to 10 wt %, and whether or not the length of each connection part 5 was formed as designed was evaluated as described above. The evaluation results are shown below.

| Example 1 | | | | | |
|---|---|---|---|---|---|
| Content by percentage | 0.1% | 0.2% | 0.5% | 2% | 10% |
| Success rate | 96% | 100% | 100% | 100% | 100% |

| Example 2 | | | | | |
|---|---|---|---|---|---|
| Content by percentage | 0.1% | 0.2% | 0.5% | 2% | 10% |
| Success rate | 96% | 100% | 100% | 100% | 100% |

| Example 3 | | | | | |
|---|---|---|---|---|---|
| Content by percentage | 0.1% | 0.2% | 0.5% | 2% | 10% |
| Success rate | 95% | 100% | 100% | 100% | 100% |

As shown in Table 2, for all of the Examples 1 to 3, it was possible to form the connection parts 5 (and non-connected parts 7) substantially as designed when the amount of the compound including a siloxane structure was within a range from 0.1% to 10%. Particularly, it was possible to form the connection parts 5 (and non-connected parts 7) as designed when the amount of the compound including a siloxane structure was within a range from 0.2% to 10%.

{Others}

The foregoing embodiments are for facilitating the understanding of the invention, and are not to be construed as limiting the invention. The invention may be modified and/or improved without departing from the gist thereof, and it goes without saying that the invention encompasses equivalents thereof.

REFERENCE SIGNS LIST

1: Intermittently connected optical fiber ribbon;
3: Optical fiber;
3A: Glass fiber;
3B: Cover layer;
5: Connection part;
7: Non-connected part;
9: Connecting agent;
20: Manufacturing device;
22: Application section;
24: Removal section;
241: Rotary blade;
241A: Recess;
26: Light source;
26A: Temporary curing light source;
26B: Permanent curing light source.

The invention claimed is:

1. An intermittently connected optical fiber ribbon comprising:
a plurality of optical fibers arranged side by side; and connection parts arranged intermittently and each connecting two adjacent ones of said optical fibers, said connection part being formed by curing a UV-curable resin including a siloxane structure in its molecule, the viscosity of the UV-curable resin before being cured being within a range from 0.5 to 7.0 MPa·s in a temperature range from 25° C. to 50° C.

2. The intermittently connected optical fiber ribbon according to claim 1, wherein said UV-curable resin includes a urethane oligomer including said siloxane structure.

3. The intermittently connected optical fiber ribbon according to claim 1, wherein said UV-curable resin includes a reactive monomer including said siloxane structure.

4. A method for manufacturing an intermittently connected optical fiber ribbon that includes a plurality of optical fibers arranged side by side, and connection parts arranged intermittently and each connecting two adjacent ones of said optical fibers, said method comprising:
   a step of applying, between said optical fibers, a UV-curable resin including a siloxane structure in its molecule;
   a step of removing a portion of said UV-curable resin applied between said optical fibers; and
   a step of irradiating said UV-curable resin between said optical fibers with UV rays and forming said connection parts,
   wherein the viscosity of the UV-curable resin before being cured is within a range from 0.5 to 7.0 MPa·s in a temperature range from 25° C. to 50° C.

5. A UV-curable resin composition used for formation of connection parts that are intermittently arranged to connect two adjacent ones of optical fibers in an intermittently connected optical fiber ribbon, said UV-curable resin composition comprising a siloxane structure in its molecule, the viscosity of the UV-curable resin composition before being cured being within a range from 0.5 to 7.0 MPa·s in a temperature range from 25° C. to 50° C.

6. An intermittently connected optical fiber ribbon comprising:
   a plurality of optical fibers arranged side by side; and
   connection parts arranged intermittently and each connecting two adjacent ones of said optical fibers, said connection part being formed by curing a connecting agent including, in a UV-curable resin serving as a base agent, from 0.1 wt % to 10 wt % of a urethane oligomer and/or a reactive monomer each including a siloxane structure in its molecule.

7. The intermittently connected optical fiber ribbon according to claim 6, wherein said connection part is formed by curing a connecting agent including, in a UV-curable resin serving as a base agent, from 0.2 wt % to 10 wt % of a urethane oligomer and/or a reactive monomer each including a siloxane structure in its molecule.

8. A method for manufacturing an intermittently connected optical fiber ribbon that includes a plurality of optical fibers arranged side by side, and connection parts arranged intermittently and each connecting two adjacent ones of said optical fibers, said method comprising:
   a step of applying, between said optical fibers, a connecting agent including, in a UV-curable resin serving as a base agent, from 0.1 wt % to 10 wt % of a urethane oligomer and/or a reactive monomer each including a siloxane structure in its molecule;
   a step of removing a portion of said connecting agent applied between said optical fibers; and
   a step of irradiating said connecting agent between said optical fibers with UV rays and forming said connection parts.

9. The method for manufacturing an intermittently connected optical fiber ribbon according to claim 8, wherein said connection part is formed by curing a connecting agent including, in a UV-curable resin serving as a base agent, from 0.2 wt % to 10 wt % of a urethane oligomer and/or a reactive monomer each including a siloxane structure in its molecule.

10. A connecting agent used for formation of connection parts that are intermittently arranged to connect two adjacent ones of optical fibers in an intermittently connected optical fiber ribbon, said connecting agent including, in a UV-curable resin serving as a base agent, from 0.1 wt % to 10 wt % of a urethane oligomer and/or a reactive monomer each including a siloxane structure in its molecule.

11. The connecting agent according to claim 10, wherein said connecting agent includes, in a UV-curable resin serving as a base agent, from 0.2 wt % to 10 wt % of a urethane oligomer and/or a reactive monomer each including a siloxane structure in its molecule.

* * * * *